United States Patent
Yoon et al.

(10) Patent No.: US 10,744,483 B2
(45) Date of Patent: Aug. 18, 2020

(54) METHOD FOR PRODUCING SUPER ABSORBENT POLYMER AND SUPER ABSORBENT POLYMER

(71) Applicant: LG Chem, Ltd., Seoul (KR)

(72) Inventors: Ki Youl Yoon, Daejeon (KR); Hyo Sook Joo, Daejeon (KR); Gi Cheul Kim, Daejeon (KR); Hyeon Choi, Daejeon (KR); Ju Eun Kim, Daejeon (KR)

(73) Assignee: LG Chem, Ltd. (KR)

( * ) Notice: Subject to any disclaimer, the term of this patent is extended or adjusted under 35 U.S.C. 154(b) by 33 days.

(21) Appl. No.: 16/092,923

(22) PCT Filed: Jun. 15, 2017

(86) PCT No.: PCT/KR2017/006273
§ 371 (c)(1),
(2) Date: Oct. 11, 2018

(87) PCT Pub. No.: WO2018/004162
PCT Pub. Date: Jan. 4, 2018

(65) Prior Publication Data
US 2019/0134602 A1    May 9, 2019

(30) Foreign Application Priority Data
Jun. 27, 2016    (KR) .................. 10-2016-0080130

(51) Int. Cl.
*B01J 20/26*    (2006.01)
*B01J 20/10*    (2006.01)
(Continued)

(52) U.S. Cl.
CPC ........... *B01J 20/267* (2013.01); *B01J 20/103* (2013.01); *B01J 20/28004* (2013.01);
(Continued)

(58) Field of Classification Search
None
See application file for complete search history.

(56) References Cited

U.S. PATENT DOCUMENTS 3,230,184 A * 1/1966 Alford ................. C08K 7/20
523/219
7,179,851 B2    2/2007 Qin et al.
(Continued)

FOREIGN PATENT DOCUMENTS

EP    1112780 A2    7/2001
EP    1158028 A1    11/2001
(Continued)

OTHER PUBLICATIONS

Extended European Search Report including the Written Opinion for Application No. EP 17820439.2 dated Mar. 1, 2019.
(Continued)

*Primary Examiner* — Joseph D Anthony
(74) *Attorney, Agent, or Firm* — Lerner, David, Littenberg, Krumholz & Mentlik, LLP

(57) ABSTRACT

The present invention relates to a super absorbent polymer having more improved absorbency under pressure and liquid permeability, and a method for producing the same. The super absorbent polymer comprises a base polymer powder including a cross-linked polymer of a monomer containing a water-soluble ethylenically unsaturated compound or its salt; and a surface cross-linked layer that is formed on the base polymer powder and is further cross-linked from the cross-linked polymer, wherein a glass hollow particle having a micron-scale particle size is included on the surface cross-linked layer.

10 Claims, 1 Drawing Sheet

(51) Int. Cl.
*B01J 20/28* (2006.01)
*B01J 20/30* (2006.01)
*B01J 20/32* (2006.01)
*C08L 33/02* (2006.01)
*C08J 3/24* (2006.01)
*C08K 7/28* (2006.01)
*C08K 3/40* (2006.01)
*C08F 20/06* (2006.01)
*C08F 20/66* (2006.01)
*C08J 3/075* (2006.01)
*C08J 3/12* (2006.01)

(52) U.S. Cl.
CPC ... *B01J 20/28011* (2013.01); *B01J 20/28021* (2013.01); *B01J 20/3021* (2013.01); *B01J 20/3085* (2013.01); *B01J 20/321* (2013.01); *B01J 20/3234* (2013.01); *B01J 20/3293* (2013.01); *C08F 20/06* (2013.01); *C08F 20/66* (2013.01); *C08J 3/075* (2013.01); *C08J 3/12* (2013.01); *C08J 3/24* (2013.01); *C08J 3/245* (2013.01); *C08K 3/40* (2013.01); *C08K 7/28* (2013.01); *C08L 33/02* (2013.01); *C08J 2333/02* (2013.01); *C08J 2333/18* (2013.01)

(56) References Cited

U.S. PATENT DOCUMENTS

| | | |
|---|---|---|
| 9,193,627 B2 | 11/2015 | Dantin et al. |
| 2004/0078015 A1 | 4/2004 | Copat et al. |
| 2004/0137160 A1* | 7/2004 | Ishihara ............... B05D 5/00 427/207.1 |
| 2005/0123590 A1 | 6/2005 | Burton et al. |
| 2007/0225160 A1 | 9/2007 | Kitano et al. |
| 2010/0100066 A1 | 4/2010 | Azad et al. |
| 2012/0001122 A1* | 1/2012 | Wattebled ............... A61F 13/00 252/194 |
| 2012/0271260 A1 | 10/2012 | Azad et al. |
| 2014/0088244 A1 | 3/2014 | Takeishi et al. |
| 2014/0371351 A1* | 12/2014 | Dantin .................. B01F 3/1214 524/5 |
| 2015/0157759 A1 | 6/2015 | Azad et al. |
| 2015/0224046 A1 | 8/2015 | Lorant et al. |
| 2016/0288088 A1 | 10/2016 | Kim et al. |
| 2019/0134602 A1* | 5/2019 | Yoon ........................ C08J 3/245 |
| 2019/0176125 A1* | 6/2019 | Yoon .................. B01J 20/28011 |

FOREIGN PATENT DOCUMENTS

| | | |
|---|---|---|
| EP | 1689456 A1 | 8/2006 |
| EP | 3342800 A1 | 7/2018 |
| JP | 2012505940 A | 3/2012 |
| JP | 5981532 B2 | 8/2016 |
| KR | 20070096831 A | 10/2007 |
| KR | 20130120300 A | 11/2013 |
| KR | 20150020030 A | 2/2015 |
| KR | 20150066454 A | 6/2015 |
| KR | 20150141425 A | 12/2015 |

OTHER PUBLICATIONS

George Odian, "Principles of Polymerization", A Wiley-Interscience Publication, Second Edition, 1981, p. 203.

Reinhold Schwalm, "UV Coatings: Basics, Recent Developments and New Applications", Dec. 21, 2006, p. 115.

International Search Report for PCT/KR2017/006273 dated Sep. 19, 2017.

* cited by examiner

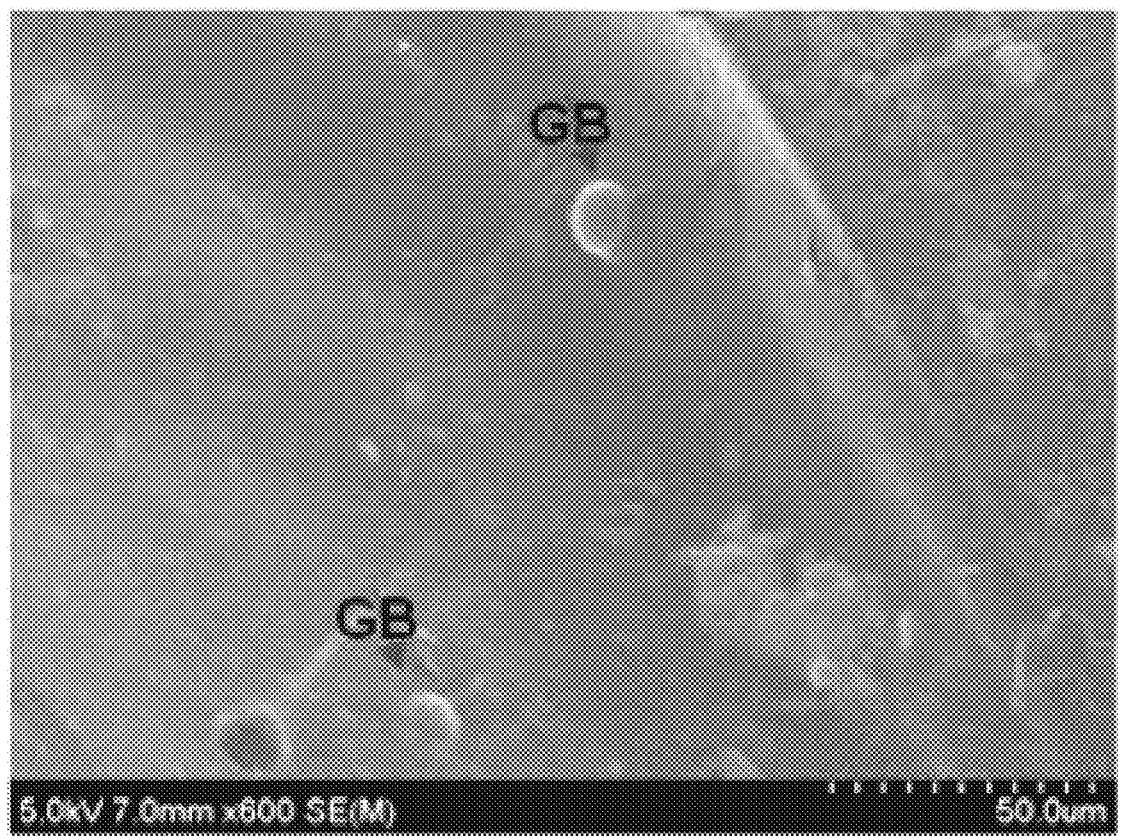

METHOD FOR PRODUCING SUPER ABSORBENT POLYMER AND SUPER ABSORBENT POLYMER

CROSS-REFERENCE TO RELATED APPLICATIONS

This application is a national phase entry under 35 U.S.C. § 371 of International Application No. PCT/KR2017/006273, filed Jun. 15, 2017, which claims priority to Korean Patent Application No. 10-2016-0080130, filed Jun. 27, 2016, the disclosures of which are incorporated herein by reference.

TECHNICAL FIELD

The present invention relates to a super absorbent polymer having more improved absorbency under pressure and liquid permeability, and a method for producing the same.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. For these applications, the super absorbent polymer should exhibit a high moisture absorbency, it should not release the absorbed water even in the external pressure, and additionally it should well retain the shape even in a state where the volume is expanded (swelled) by absorbing water, and thereby exhibit excellent liquid permeability.

Particularly, in recent years, with the development of hygienic materials such as diapers in which the content of pulps has been reduced or pulps have been eliminated, there is an increasing technical demand for further improving the absorbency under pressure and the liquid permeability of the super absorbent polymer. In this regard, there have been many attempts from the past to improve the surface gel strength/hardness of the super absorbent polymer, to inhibit the blocking between the super absorbent polymer particles and to further improve the absorbency under pressure and the liquid permeability of the super absorbent polymer.

Typically, attempts have been made to use silica particles such as fumed silica during surface crosslinking or after surface crosslinking, in order improve the gel strength of the super absorbent polymer, to inhibit the blocking and to improve the absorbency under pressure and the liquid permeability of the super absorbent polymer.

However, since the silica particles were difficult to uniformly distribute on the surface cross-linked layer because the aggregation between particles is large and the dispersibility of a surface crosslinking liquid is very low. As a result, the improvement of the absorbency under pressure and the liquid permeability of the super absorbent polymer due to the use thereof has been limited.

Due to the above-mentioned problems, attempts to further improve the absorbency under pressure and the liquid permeability of the super absorbent polymer are continuously performed.

Technical Problem

The present invention provides a super absorbent polymer having more improved absorbency under pressure and liquid permeability, and a method for producing the same.

Technical Solution

The present invention provides a method for producing a super absorbent polymer comprising the steps of:

carrying out a crosslinking polymerization of a monomer composition containing a water-soluble ethylenically unsaturated compound or its salt in the presence of an internal crosslinking agent;

drying, pulverizing, and classifying the cross-linked hydrogel polymer to form a base polymer powder; and surface-crosslinking the base polymer powder in the presence of a glass hollow particle having a micron-scale particle size and a surface crosslinking agent to form a surface cross-linked layer.

The present invention also provides a super absorbent polymer comprising:

a base polymer powder including a cross-linked polymer of a monomer containing a water-soluble ethylenically unsaturated compound or its salt; and a surface cross-linked layer that is formed on the base polymer powder and is further cross-linked from the cross-linked polymer, wherein a glass hollow particle having a micron-scale particle size is included on the surface cross-linked layer.

Hereinafter, a super absorbent polymer according to a specific embodiment of the present invention and a production method thereof will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprises" or "contains" refers to including any constituent element (or constituent component) without particular limitation, and it cannot be interpreted as a meaning of excluding an addition of other constituent element (or constituent component).

According to one embodiment of the invention, there is provided a method for producing a super absorbent polymer comprising the steps of:

carrying out a crosslinking polymerization of a monomer composition containing a water-soluble ethylenically unsaturated compound or its salt in the presence of an internal crosslinking agent;

drying, pulverizing, and classifying the cross-linked hydrogel polymer to form a base polymer powder; and surface-crosslinking the base polymer powder in the presence of a glass hollow particle having a micron-scale particle size and a surface crosslinking agent to form a surface cross-linked layer.

In the method for producing a super absorbent polymer according to one embodiment, surface cross-linking is carried out using a surface cross-linking solution containing a glass hollow particle having a micron-scale particle size together with a surface crosslinking agent. Such a glass hollow particle having a micron-scale particle size has at least a particle size of less than 1 mm, i.e., expressed in unit of microns (μm), more specifically a particle size of 10 to 100 μm, or 10 to 90 μm, or 10 to 30 μm, defined by D50, and may refer to a hollow particle in the form of a hollow surrounded by a thin glass wall. Such glass hollow particle may have, for example, a low density of 0.1 to 0.7 g/cc together with the above-mentioned particle size. In addition, the glass hollow particle may have a hollow having a size determined by the particle size range and the low density range.

In addition, such glass hollow particle may have a substantially spherical shape, and may have the above-mentioned low density.

As a result of continuous experiments by the present inventors, it has been found that when the surface crosslinking is carried out by incorporating the glass hollow particles into the surface crosslinking solution, it is possible to further increase the hardness of the surface of the super absorbent polymer, to more effectively inhibit blocking between particles, and thereby to further improve the absorbency under pressure and the liquid permeability.

Particularly, the glass hollow particle can exhibit excellent dispersibility in a surface crosslinking solution having an aqueous solution state or the like and thus can be uniformly distributed on the surface crosslinking layer and can be used with a relatively high content. Thus, when the glass hollow particle is used, the hardness of the surface crosslinked layer, that is, the surface hardness and strength of the super absorbent polymer particle, can be more uniformly and more effectively improved. As a result, it has been found that the absorbency under pressure and the liquid permeability of the super absorbent polymer can be further improved.

Hereinafter, a method for producing a super absorbent polymer according to one embodiment will be described in detail for each step.

First, in the production method of one embodiment, as the monomer, a water-soluble ethylenically unsaturated compound or a salt thereof, previously known to be usable for the production of a super absorbent polymer, can be used without particular limitation.

More specific example of these monomers include at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol (meth)acrylate or polyethylene glycol (meth)acrylate; and amino group-containing unsaturated monomers of (N,N)-dimethylaminoethyl(meth)acrylate or (N,N)-dimethylaminopropyl(meth)acrylamide, and their quaternary product.

In particular, the monomer may include a monomer (a salt of an anionic monomer) having at least partially neutralized acidic group contained in the anionic monomer. More specifically, acrylic acid or a salt thereof may be used as the monomer. When acrylic acid is used, it can be used by neutralizing at least a part thereof. The use of such monomers enables production of the super absorbent polymer with superior physical properties. For example, as the water-soluble ethylenically unsaturated compound, acrylic acid can be used, and an alkali metal salt thereof can be used therewith. In this case, the monomer can be used by partially neutralizing acrylic acid with a basic compound such as caustic soda (NaOH).

The degree of neutralization of such monomer may be 20 mol % or more, or 20 to 90 mol %, or 30 to 80 mol %, in consideration of the physical properties or the like of the super absorbent polymer finally produced.

Meanwhile, among the monomer composition containing the monomer and the like, the concentration of the monomer containing the water-soluble ethylenically unsaturated compound or its salt may be 20 to 60% by weight or 40 to 50% by weight based on the total content of the monomer composition, and it can be adjusted to an appropriate concentration in consideration of the polymerization time, the reaction conditions and the like. However, when the concentration of the monomer is excessively low, the yield of the super absorbent polymer is lowered and it may lead to a problem in terms of economic efficiency. Conversely, when the concentration of the monomer is excessively high, it may lead to problems in the processes, for example, a part of the monomer may be precipitated, or the pulverization efficiency may be lowered during pulverization of the polymerized hydrogel polymer, etc., and the physical properties of the super absorbent polymer may be deteriorated.

In the production method of this embodiment, in order to produce the super absorbent polymer into a porous form to further improve its absorption rate, a foaming step of the monomer composition may be carried out.

Such a foaming step can be carried out by a method such as stirring the monomer composition before polymerization. Such foaming step can proceed for about 10 seconds to 5 minutes.

In addition, the monomer composition may further include a polymerization initiator generally used in the production of a super absorbent polymer.

Specifically, the polymerization initiator may include a thermal polymerization initiator or a photo polymerization initiator by UV irradiation, according to the polymerization method such as a thermal polymerization or a photo polymerization. However, even in the case of photo polymerization method, because a certain amount of heat is generated by the irradiation of UV ray and the like, and a certain amount of heat is generated in accordance with the progress of the polymerization reaction, which is an exothermic reaction, and thus, a thermal polymerization initiator may be further included.

The photo polymerization initiator can be used without limitation in its constitution as long as it is a compound capable of forming a radical by light such as ultraviolet rays.

The photo-polymerization initiator used herein may include, for example, at least one selected from the group consisting of benzoin ether, dialkyl acetophenone, hydroxyl alkylketone, phenyl glyoxylate, benzyl dimethyl ketal, acyl phosphine and α-aminoketone. Meanwhile, specific examples of the acyl phosphine, commercialized lucirin TPO, namely, 2,4,6-trimethyl-benzoyl-trimethyl phosphine oxide may be used. More various photo polymerization initiators are well disclosed in "UV Coatings: Basics, Recent Developments and New Application" written by Reinhold Schwalm, (Elsevier, 2007), p 115, however the example of the photo polymerization initiator is not limited thereto.

The photo polymerization initiator may be included in a concentration of 0.01 to 1.0% by weight based on the monomer composition. When the concentration of the photo polymerization initiator is too low, the polymerization rate may become slow, and when the concentration of the photo polymerization initiator is too high, the molecular weight of the super absorbent polymer is small and the physical properties may become uneven.

And, as the thermal polymerization initiator, one or more selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4$)$_2S_2O_8$), and the like; and examples of the azo-based initiator include 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) or the like. More various thermal polymerization initiators are well disclosed in "Principle of Polymerization" written by Odian, (Wiley, 1981), p 203, however the example of the thermal polymerization initiator is not limited thereto.

The thermal polymerization initiator may be included in a concentration of 0.001 to 1.0% by weight with respect to the monomer composition. If the concentration of such a thermal polymerization initiator is too low, additional thermal polymerization hardly occurs and the effect due to the addition of the thermal polymerization initiator may be insignificant. If the concentration of the thermal polymerization initiator is excessively high, the molecular weight of the super absorbent polymer may be small and the physical properties may become uneven.

Meanwhile, after the monomer composition containing each of the above-described components is formed in the form of an aqueous solution or suspension, crosslinking polymerization of the monomer composition may proceed in the presence of an internal crosslinking agent to obtain a hydrogel polymer.

In this case, as the internal crosslinking agent, any crosslinking agent previously known to be usable for the production of the super absorbent polymer can be used. As a specific example, the internal crosslinking agent may be at least one selected from the group consisting of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate. In addition, various other internal crosslinking agents can be used.

Such internal crosslinking agent may be contained together with other components in the monomer composition or may be additionally added. The internal crosslinking agent can be used in an amount of 0.001 to about 5% by weight, about 0.001 to about 3% by weight, about 0.001 to about 1% by weight, or about 0.001 to about 0.5% by weight, based on the monomer composition. In particular, as such internal crosslinking agent is used in an amount of 0.01 to 5 parts by weight, 0.01 to 3 parts by weight, 0.01 to 1 part by weight, or 0.1 to 0.6 parts by weight, based on 100 parts by weight of the unneutralized water-soluble ethylenically unsaturated compound described above, for example, the unneutralized acrylic acid, the super absorbent polymer having an optimized cross-linked structure and having more excellent physical properties can be produced.

In addition, the monomer composition may further include additives such as a thickener, a plasticizer, a preservation stabilizer, an antioxidant and the like, if necessary.

Further, the monomer composition containing the monomer, the additive and the like as described above is formed in the form of a solution or suspension in which each component is dissolved or dispersed in a solvent.

In this case, any usable solvent can be used without limitation in its constitution as long as it can dissolve or disperse the above-mentioned components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination.

The solvent may be included in the residual quantity excluding the components disclosed above based on the total content of the monomer composition.

Meanwhile, the method of forming a hydrogel polymer by subjecting such monomer composition to the thermal polymerization or photo polymerization can be used without limitation in the constitution as long as it is a method generally used in the polymerization.

Specifically, the polymerization method is largely classified into a thermal polymerization and a photo polymerization according to the polymerization energy source. Usually, the thermal polymerization may be carried out in the reactor like kneader equipped with agitating spindles. Further, the thermal polymerization can be carried out at a temperature of 40 to 120° C.

Conversely, the photo polymerization may be carried out in the reactor equipped with movable conveyor belt, however the polymerization method disclosed above is only one example, and the present invention is not limited to the polymerization methods disclosed above.

The hydrogel polymer obtained by the above-mentioned method may typically have a water content of about 40 to about 80% by weight. Meanwhile, the "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 180° C., and then the temperature may be maintained at 180° C., and the total drying time may be set to 40 minutes, including 5 minutes for the temperature rising step.

After crosslinking polymerization of the monomers, drying, pulverizing, and classifying steps may be carried out to obtain the base polymer powder. Through such pulverizing and classifying steps, the base polymer powder and the super absorbent polymer obtained therefrom are suitably produced and provided such that they have a particle size of 150 µm to 850 µm. More specifically, at least 95% by weight of the base polymer powder and the super absorbent polymer obtained therefrom may have a particle size of 150 µm to 850 µm, and fine powder having a particle size of less than 150 µm may be less than 3% by weight.

As such, as particle size distributions of the base polymer powder and the super absorbent polymer are adjusted within the preferred range, the super absorbent polymer finally produced may exhibit the above-described excellent physical properties, particularly superior centrifuge retention capacity and liquid permeability.

Meanwhile, the methods of performing the drying, pulverizing, and classifying will be described in more detail as follows.

First, in drying the hydrogel polymer, a coarse pulverization (gel pulverization) step may be further carried out before drying in order to increase the efficiency of the drying process, if necessary.

There is no limitation in the constitution of a pulverizing machine to be used. Specifically, any one device selected from the group consisting of a vertical pulverizer, a turbo cutter, a turbo grinder, a rotary cutter mill, a cutter mill, a disc mill, a shred crusher, a crusher, a chopper, and a disc cutter may be used, but it is not limited thereto.

In this case, the coarse pulverization may be carried out such that the hydrogel polymer has a particle size of 0.1 to 20 mm.

Due to the high water content of the hydrogel polymer, it is technically not easy to pulverize the hydrogel polymer into a particle size of less than 0.1 mm, and an agglomeration phenomenon between the pulverized particles may occur. Meanwhile, when the particle size is larger than 10 mm, the effect of increasing the efficiency of the subsequent drying step may be unsatisfactory.

The hydrogel polymer coarsely pulverized as above or the hydrogel polymer immediately after polymerization without the coarse pulverizing step is subjected to a drying step. In this case, a drying temperature of the drying step may be 150° C. to 250° C. When the drying temperature is lower than 150° C., it is likely that the drying time becomes too long or the physical properties of the super absorbent polymer finally formed are deteriorated, and when the drying temperature is higher than 250° C., only the surface of the polymer is excessively dried, and thus it is likely that fine powder is generated during the subsequent pulverizing step and the physical properties of the super absorbent polymer finally formed are deteriorated. Therefore, the drying step may be preferably carried out at a temperature of 150° C. to 200° C., and more preferably at a temperature of 160° C. to 190° C.

Meanwhile, the drying may proceed for 20 to 90 minutes in consideration of process efficiency, etc., but is not limited thereto.

In the drying step, the drying method may also be selected and used without any limitation in the constitution, as long as it is a method generally used for drying the hydrogel polymer. Specifically, the drying step may be carried out by a method such as hot air supply, infrared irradiation, microwave irradiation, or ultraviolet irradiation. After the drying step as above is finished, the water content of the polymer may be 0.1% to 10% by weight.

Subsequently, the dried polymer obtained through the drying step is subjected to a pulverization step.

The polymer powder obtained through the pulverizing step may have a particle size of 150 to 850 μm. Specific examples of a pulverizing device that can be used to pulverize into the above particle size may include a ball mill, a pin mill, a hammer mill, a screw mill, a roll mill, a disc mill, a jog mill or the like, but it is not limited to the above-described examples.

Further, in order to control the physical properties of the super absorbent polymer powder finally commercialized after the pulverization step, a separate step of classifying the polymer powder obtained after the pulverization depending on the particle size may be undergone. Preferably, a polymer having a particle size of 150 to 850 μm is classified and only the polymer powder having such a particle size can be subjected to the surface crosslinking reaction and finally commercialized. Since the particle size distribution of the base polymer powder obtained through these steps has already been described above, a further detailed description thereof will be omitted.

Meanwhile, after the step of forming the above-described base polymer powder, the surface of the base polymer powder may be further cross-linked in the presence of a glass hollow particle having a micron-scale particle size and a surface crosslinking agent to form a surface cross-linked layer, thereby producing a super absorbent polymer.

As described above, in the surface cross-linking step, as the glass hollow particle is used, it becomes possible to form a surface cross-linked layer and a super absorbent polymer with improved surface hardness and strength, thereby further improving the absorbency under pressure and the liquid permeability of the finally formed super absorbent polymer.

In such surface cross-linking step, as the surface-crosslinking agent, any component previously known to be usable for the production of the super absorbent polymer can be used without particular limitation. One or more selected from the group consisting of a polyhydric alcohol compound, an epoxy compound, a polyamine compound, a haloepoxy compound, a condensation product of the haloepoxy compound, an oxazoline compound, a mono-, di-, or poly-oxazolidinone compound, a cyclic urea compound, a polyvalent metal salt, and an alkylene carbonate compound may be used as the surface crosslinking agent. In addition, various other surface crosslinking agents can be used.

Moreover, the glass hollow particle contained together with the surface crosslinking agent has a particle size of 10 to 100 μm, or 10 to 90 μm, or 10 to 30 μm, defined by D50, and may have a hollow surrounded by a thin glass wall. Such glass hollow particle may have, for example, a low density of 0.1 to 0.7 g/cc, or 0.3 to 0.6 g/cc, together with the above-mentioned particle size, and it may have a hollow having a size determined by such density range and particle size.

In addition, such glass hollow particle can have a spherical particle shape surrounded by thin and transparent glass walls, and can have the above-mentioned low density.

Due to the morphological/structural characteristics of these glass hollow particles, such as low density, size of particles of an appropriate size, etc., the glass hollow particles can exhibit excellent dispersibility in the surface crosslinking solution. As a result, the glass hollow particles can be uniformly distributed in the surface cross-linked layer. Further, the hardness and strength of the surface cross-linked layer can be more effectively improved, and thus the absorbency under pressure and the liquid permeability of the super absorbent polymer can be further improved.

However, when the above-mentioned morphological/structural characteristics, such as the particle size range of the glass hollow particles, are not satisfied, it is difficult to produce the glass hollow particles themselves or the application thereof may be difficult in consideration of the particle size of the super absorbent polymer particles. Further, in the case where the hollow becomes too small or the density becomes high, the physical properties of the super absorbent polymer may be rather deteriorated.

The glass hollow particles described above can be prepared directly by a method well known to those skilled in the art, or may be obtained by using commercially available glass hollow particles having the above-described structural/morphological characteristics. Since such a method for producing glass hollow particles and the like are well known to those skilled in the art, a further description thereof will be omitted.

The glass hollow particle may be contained in the surface cross-linking solution in an amount of 0.01 to 20 parts by weight, or 0.03 to 5 parts by weight, based on 100 parts by weight of the monomer such as acrylic acid. With such an appropriate content, the hardness and strength of the surface cross-linked layer can be further uniformly improved while facilitating the formation of the cross-linked layer of the super absorbent polymer, and further improving the absorbency under pressure and the liquid permeability of the super absorbent polymer.

Meanwhile, in the above-mentioned surface cross-linking step, as the surface crosslinking is performed by adding a multivalent metal cation together with the surface crosslinking agent and the glass hollow particle, the surface cross-linked structure of the super absorbent polymer can be further optimized. This is presumably because the metal cation can form a chelate with a carboxyl group (COOH) of the super absorbent polymer to further reduce the crosslinking distance.

The method of adding the surface crosslinking agent, the glass hollow particle or the surface crosslinking solution containing them to the base polymer powder is not limited by its configuration. For example, a method of dispersing and dissolving the surface crosslinking agent and the glass hollow particle in a medium such as a separate solvent to obtain a surface crosslinking solution, and then spraying the surface crosslinking solution onto the base polymer powder, or a method of continuously mixing the base polymer powder and the surface crosslinking solution while providing them to a mixer that is continuously operated may be used.

When the surface crosslinking solution containing the surface crosslinking agent and the glass hollow particle is formed, water and methanol may be further mixed and added as a medium. When water and methanol are added thereto, there is an advantage that the surface crosslinking agent and/or the glass hollow particle may be uniformly dispersed on the base polymer powder. At this time, the content of water and methanol to be added can be applied by adjusting the addition ratio to 100 parts by weight of the base polymer powder, for the purposes of inducing a uniform dispersion of the surface crosslinking agent and/or the glass hollow particle, preventing an agglomeration phenomenon of the base polymer powder, and optimizing a surface penetration depth of the crosslinking agent.

In order to produce a super absorbent polymer exhibiting more excellent physical properties, the surface crosslinking step can be carried out at a temperature of about 110° C. to 200° C.

More specifically, the conditions of the surface crosslinking step may be the conditions where the maximum reaction temperature is 140° C. or higher, or 160 to 200° C., and the retention time at the maximum reaction temperature is 20 minutes or more, or 20 minutes or more and 1 hour or less. In addition, the temperature raising time required to reach from a temperature at the start of the first reaction, for example, a temperature of about 30° C. or more, or 30 to 120° C. to the maximum reaction temperature can be controlled to 10 minutes or more, or 10 minutes or more and 1 hour or less. The surface crosslinking structure is optimized by satisfying the above-mentioned surface cross-linking process conditions, so that a super absorbent polymer exhibiting more excellent absorption properties and the like can be produced.

The temperature raising means for the surface crosslinking reaction is not particularly limited. The heating can be carried out by providing a heating medium or directly providing a heating source. The type of heat medium that can be used here includes a heated fluid such as steam, hot air, hot oil, etc., but it is not limited thereto. Further, the temperature of the heating medium to be provided can be appropriately selected in consideration of the means of the heating medium, the temperature raising speed, and the temperature raising target temperature. Meanwhile, a heat source to be provided directly may include a heating method using electricity or a heating method using gas, but is not limited thereto.

The super absorbent polymer obtained according to the production method of one embodiment described above can exhibit very excellent characteristics which improve various physical properties such as a liquid permeability and an absorbency under pressure together, and also can exhibit excellent physical properties that can be suitably used for sanitary articles such as diapers.

The super absorbent polymer produced by the method of the above-mentioned embodiment comprises, for example, a base resin powder including a cross-linked polymer of a monomer containing a water-soluble ethylenically unsaturated monomer or a salt thereof; and a surface cross-linked layer that is formed on the base resin powder and is further cross-linked from the cross-linked polymer, wherein a glass hollow particle having a micron-scale particle size is included on the surface cross-linked layer.

In such a super absorbent polymer, the glass hollow particle has predetermined structural/morphological characteristics such as certain range of particle size and a low density as already described above. The details thereof have already been described in detail, and thus a further description thereof will be omitted.

In addition, the glass hollow particle may be contained in the super absorbent polymer in a content corresponding to the content in the monomer composition, thereby exhibiting more improved properties such as the absorbency under pressure and the liquid permeability.

Further, the super absorbent polymer can exhibit excellent absorption characteristics that a centrifuge retention capacity (CRC) for a physiological saline solution (0.9 wt % sodium chloride aqueous solution) for 30 minutes is 35 to 45 g/g, or 35 to 40 g/g and also exhibit excellent absorbency under pressure, the absorbency under pressure (AUP) at 0.7 psi for a physiological saline solution (0.9 wt % sodium chloride aqueous solution) for 1 hour being 15 to 28 g/g, or 17 to 25 g/g.

The centrifuge retention capacity (CRC) for a physiological saline solution can be measured according to EDANA recommended test method No. WSP 241.2. More specifically, the centrifuge retention capacity can be calculated according to the following Calculation Equation 1 after absorbing the super absorbent polymer in a physiological saline solution for 30 minutes:

$$CRC\ (g/g) = \{[W_2\ (g) - W_1\ (g)]/W_0\ (g)\} - 1 \quad \text{[Calculation Equation 1]}$$

in Calculation Equation 1, $W_0$ (g) is an initial weight (g) of the super absorbent polymer, $W_1$ (g) is a weight of the device, which is measured after performing dehydration by using a centrifuge without the super absorbent polymer at 250 G for 3 minutes, and $W_2$ (g) is a weight of the device including the super absorbent polymer, which is measured after immersing and absorbing the super absorbent polymer in a physiological saline solution (0.9 wt % sodium chloride aqueous solution) at room temperature for 30 minutes and then performing dehydration by using a centrifuge at 250 G for 3 minutes.

Further, the absorbency under pressure (AUP) may be calculated according to the following Calculation Equation 2, after absorbing the super absorbent polymer in a physiological saline solution under a load of about 0.7 psi over 1 hour.

$$AUP\ (g/g) = [W_4\ (g) - W_3\ (g)]/W_0\ (g) \quad \text{[Calculation Equation 2]}$$

in Calculation Equation 2, $W_0$ (g) is an initial weight (g) of the super absorbent polymer, $W_3$ (g) is the total sum of a weight of the super absorbent polymer and a weight of the device capable of providing a load to the super absorbent polymer, and $W_4$ (g) is the total sum of a weight of the super absorbent polymer and a weight of the device capable of providing a load to the super absorbent polymer, after absorbing a physiological saline solution to the super absorbent polymer under a load (0.7 psi) for 1 hour.

Further, the super absorbent polymer can have the extractable content of 25% by weight or less, or 20% by weight or less, and thus can exhibit excellent physical properties.

Further, the super absorbent polymer can exhibit a gel bed permeability (GBP) of 2 darcy or more, or 2.5 to 10 darcy. That is, as the super absorbent polymer can further the surface hardness and the strength as the glass hollow particles are uniformly dispersed and contained in the surface cross-linked layer, thereby exhibiting excellent liquid permeability.

The gel bed permeability (GBP) is expressed as "Darcy" which is a CGS unit of permeability. For example, 1 Darcy is the permeability of a solid through which 1 $cm^2$ of fluid having a viscosity of 1 cps will flow in 1 second through a section being 1 cm in thickness and 1 $cm^2$ in cross-section, if the pressure difference between the two sides of the solid is 1 atm. Permeability has the same units as area, and is expressed in $m^2$, since there is no SI unit for permeability. 1 Darcy corresponds to about $0.98692 \times 10^{-12}\ m^2$ or about $0.98692 \times 10^{-8}\ cm^2$. A method of measuring the gel bed permeability is disclosed in U.S. Pat. No. 7,179,851. The gel bed permeability (GBP) is the permeability of a swollen bed of gel particles (e.g., the surface treated absorbent material or the super absorbent material prior to being surface treated), under conditions commonly referred to as "free swell" conditions.

Advantageous Effects

According to the present invention, a super absorbent polymer having more improved absorbency under pressure and liquid permeability, and a method for producing the same can be provided.

BRIEF DESCRIPTION OF THE DRAWINGS

FIG. 1 is an electron micrograph of the super absorbent polymer produced in Example 3, which shows that a glass hollow particle (GB) is contained on the surface cross-linked layer.

DETAILED DESCRIPTION OF THE EMBODIMENTS

Hereinafter, preferred examples are provided for better understanding of the invention. However, these Examples are given for illustrative purposes only and are not intended to limit the scope of the present invention thereto.

In the Preparation Examples, Examples and Comparative Examples described below, the physical properties of the super absorbent polymers were measured and evaluated by the following methods.

(1) Evaluation of Particle Sizes

The particle sizes of the base polymer powders and the super absorbent polymers used in Examples and Comparative Examples were measured according to EDANA (European Disposables and Nonwovens Association) recommended test method No. WSP 220.3.

(2) Centrifuge Retention Capacity (CRC)

The centrifuge retention capacity (CRC) by water absorption capacity under a non-loading condition was measured for the super absorbent polymers of Examples and Comparative Examples in accordance with EDANA (European Disposables and Nonwovens Association) recommended test method No. WSP 241.3.

That is, $W_0$ (g, about 0.2 g) of the polymers of Examples and Comparative Examples were uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2$ (g) of the bag was then measured. Further, the same procedure was carried out without using the polymer, and then the resultant weight $W_1$ (g) was measured.

Using the respective weights thus obtained. CRC (g/g) was calculated according to the following Calculation Equation 1, thereby confirming the centrifuge retention capacity.

$$CRC\ (g/g) = \{[W_2\ (g) - W_1\ (g) - W_0\ (g)]/W_0\ (g)\} \quad \text{[Calculation Equation 1]}$$

in Calculation Equation 1, $W_0$ (g) is an initial weight (g) of the super absorbent polymer.

$W_1$ (g) is a weight of the device, which is measured after immersing and absorbing the same into a physiological saline solution for 30 minutes and then performing dehydration by using a centrifuge without the super absorbent polymer at 250 G for 3 minutes, and $W_2$ (g) is a weight of the device including the super absorbent polymer, which is measured after immersing and absorbing the super absorbent polymer in a physiological saline solution at room temperature for 30 minutes and then performing dehydration by using a centrifuge at 250 G for 3 minutes.

(3) Absorbency Under Pressure (AUP)

The absorbency under pressure (AUP) was measured for each super absorbent polymer of Examples and Comparative Examples according to EDANA (European Disposables and Nonwovens Association) recommended test method No. WSP 242.3.

First, a 400 mesh metal made of stainless steel was installed at the bottom of a plastic cylinder having an inner diameter of 60 mm. $W_0$ (g, about 0.90 g) of the polymer obtained in Examples 1 to 6 and Comparative Examples 1 to 3 were uniformly scattered on the screen under conditions of a temperature of 23±2° C., and a relative humidity of 45%. Then, a piston capable of uniformly providing a load of 4.83 kPa (0.7 psi) was put thereon, in which the external diameter of the piston was slightly smaller than 60 mm, there was no gap between the internal wall of the cylinder and the piston, and the jig-jog of the cylinder was not interrupted. At this time, the weight $W_3$ (g) of the device was measured.

A glass filter having a diameter of 125 mm and a thickness of 5 mm was placed in a Petri dish having the diameter of 150 mm, and then a physiological saline solution composed of 0.90% by weight of sodium chloride was poured in the dish until the surface level became equal to the upper surface of the glass filter. A sheet of filter paper having a diameter of 120 mm was put thereon. The measuring device was put on the filter paper and the solution was absorbed for 1 hour under the load. After 1 hour, the weight $W_4$ (g) was measured after lifting up the measuring device.

The AUP (g/g) was calculated from the weights thus obtained, according to the following Calculation Equation 2, thereby confirming the absorbency under pressure:

$$\text{AUP (g/g)} = [W_4 \text{(g)} - W_3 \text{(g)}]/W_0 \text{(g)} \quad \text{[Calculation Equation 2]}$$

in Calculation Equation 2, $W_0$ (g) is an initial weight (g) of the super absorbent polymer, $W_3$ (g) is the total sum of a weight of the super absorbent polymer and a weight of the device capable of providing a load to the super absorbent polymer, and $W_4$ (g) is the total sum of a weight of the super absorbent polymer and a weight of the device capable of providing a load to the super absorbent polymer, after absorbing a physiological saline solution to the super absorbent polymer under a load (0.7 psi) for 1 hour.

(4) Content of Extractables

Among the super absorbent polymers produced in Examples and Comparative Examples, 1.0 g of sample having a particle size of 150 to 850 μm was put in a 250 mL Erlenmeyer flask, and 200 mL of a 0.9 wt % sodium chloride aqueous solution was added to a physiological saline solution and subjected to free swelling for 1 hour while stirring at 250 rpm. The aqueous solution was then filtered with a filter paper. The filtered solution was subjected to first titration up to pH 10 with 0.1 N caustic soda solution and then subjected to back titration to pH 2.7 with 0.1N hydrogen chloride solution. The content (wt %) of extractables in the super absorbent polymer was measured from the obtained proper amount according to EDANA recommended test method No. WSP 270.3.

(5) Gel Bed Permeability (GBP)

The free swell Gel Bed Permeability was measured according to the method disclosed in U.S. Pat. No. 7,179,851.

Example 1: Preparation of Super Absorbent Polymer

3M™ glass hollow particles iM30K (particle size: 15.3 μm (D50), density: 0.6 g/cc) manufactured by 3M Company were used.

537.45 g of acrylic acid, 0.32 g of Laponite RD, 0.86 g of polyethylene glycol diacrylate (Mw=598) as a crosslinking agent, 653.17 g of 30% caustic soda (NaOH), 0.04 g of diphenyl(2,4,6-trimethylbenzoyl)-phosphine oxide as UV initiator, 1.07 g of sodium persulfate, and 206.41 g of water were mixed to prepare a monomer composition having a monomer concentration of 36.7 wt % (degree of neutralization of acrylic acid: 70 mol %).

Subsequently, the monomer composition was stirred for 25 seconds under the condition of 300 rpm and subjected to foaming.

Then, the monomer composition was fed to the continuously moving conveyor belt reactor through the feeder, and then irradiated with UV rays (irradiation dose: 2 mW/cm$^2$) for 2 minutes through a UV radiation device to conduct UV polymerization for 1 minute and thermal polymerization for 2 minutes, thereby producing a hydrogel polymer.

The hydrogel polymer was transferred to a cutting machine and then cut to a size of 0.2 cm. At this time, the water content of the cut hydrogel polymer was 50 wt %.

Subsequently, the hydrogel polymer was dried in a hot air dryer at 185° C. for 40 minutes, and the dried hydrogel polymer was pulverized by using a pin mill. Then, it was classified into the polymer having the particle size (average particle size) of less than 150 μm and the polymer having the particle size of 150 μm to 850 μm by using a sieve.

After a base polymer powder was obtained through the classification, 0.154 g of 1,3-propanediol as a surface crosslinking agent, and 0.4 g of the glass hollow particle (0.04 parts by weight based on 100 parts by weight of the monomer) were added to 2.8 g of water and 3.5 g of methanol and mixed to prepare a surface crosslinking solution. Thereafter, the surface crosslinking solution was sprayed onto the base polymer powder and mixed with stirring at room temperature so that the surface crosslinking solution was uniformly distributed on the base polymer powder. Then, the base polymer powder mixed with the surface crosslinking solution was put into the surface crosslinking reactor and subjected to the surface crosslinking reaction.

In this surface crosslinking reactor, the surface crosslinking was carried out on the base polymer powder at 185° C. for 40 minutes to produce a super absorbent polymer of Example 1. After the surface crosslinking step, the obtained super absorbent polymer was classified using a standard mesh based on ASTM standard to produce a super absorbent resin of Example 1 having a particle size of 150 μm to 850 μm.

Example 2: Production of Super Absorbent Polymer

The super absorbent resin of Example 2 having a particle size of 150 μm to 850 μm was produced in the same manner as in Example 1 except that the surface crosslinking time was changed to 50 minutes.

Example 3: Production of Super Absorbent Polymer

The super absorbent resin of Example 3 having a particle size of 150 μm to 850 μm was produced in the same manner as in Example 1 except that the surface crosslinking time was changed to 60 minutes.

Comparative Example 1: Production of Super Absorbent Polymer

The super absorbent resin of Comparative Example having a particle size of 150 μm to 850 μm was produced in the same manner as in Example 1 except that the glass hollow particle was not used during formation of a surface crosslinking solution.

The measurement results of the physical properties of Examples and Comparative Example are summarized and shown in Table 1 below.

TABLE 1

|  | Example 1 | Example 2 | Example 3 | Comparative Example 1 |
|---|---|---|---|---|
| Glass hollow particle (part by weight) | 0.04 | 0.04 | 0.04 | 0 |
| CRC (base polymer powder; g/g) | 49.9 | 49.9 | 49.9 | 49.9 |
| GBP (darcy) | 2.7 | 2.8 | 3.5 | 1.8 |
| CRC(g/g) | 40.5 | 39.7 | 38.3 | 40.5 |
| AUP(g/g) | 18.9 | 21.2 | 24.1 | 17.2 |

Referring to Table 1, it was confirmed that the super absorbent polymers of Examples exhibit a centrifuge retention capacity and liquid permeability equal to or higher than those of Comparative Example, and exhibit improved physical properties such as absorbency under pressure.

The invention claimed is:

1. A method for producing a super absorbent polymer comprising the steps of:
   carrying out a crosslinking polymerization of a monomer composition containing a water-soluble ethylenically unsaturated compound or its salt in the presence of an internal crosslinking agent to form a cross-linked hydrogel polymer;
   drying, pulverizing, and classifying the cross-linked hydrogel polymer to form a base polymer powder; and
   surface-crosslinking the base polymer powder in the presence of one or more glass hollow particles having a micron-scale particle size and a surface crosslinking agent to form a surface cross-linked layer.

2. The method for producing a super absorbent polymer of claim 1, wherein the glass hollow particle is used in an amount of 0.01 to 20 parts by weight, based on 100 parts by weight of the monomer.

3. The method for producing a super absorbent polymer of claim 1, wherein the glass hollow particle has a particle size of 10 to 100 to and a density of 0.1 to 0.7 g/cc.

4. The method for producing a super absorbent polymer of claim 1, wherein the monomer includes at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol(meth)acrylate or polyethylene glycol (meth)acrylate; and amino group-containing unsaturated monomers of (N,N)-dimethylaminoethyl(meth)acrylate (N,N)-dimethylaminopropyl (meth)acrylamide, and their quaternary product.

5. The method for producing a super absorbent polymer of claim 1, wherein the internal crosslinking agent includes at least one selected from the group consisting of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate.

6. The method for producing a super absorbent polymer of claim 1, wherein the surface crosslinking step is carried out in the presence of at least one surface crosslinking agent selected from the group consisting of a polyhydric alcohol compound, an epoxy compound, a polyamine compound, a haloepoxy compound, a condensation product of the haloepoxy compound, an oxazoline compound, a mono-, di-, or poly-oxazolidinone compound, a cyclic urea compound, a polyvalent metal salt, and an alkylene carbonate compound.

7. A super absorbent polymer comprising:
   a base polymer powder including a cross-linked polymer of a monomer containing a water-soluble ethylenically unsaturated compound or its salt; and
   a surface cross-linked layer that is formed on the base polymer powder and is further cross-linked from the cross-linked polymer,
   wherein one or more glass hollow particles having a micron-scale particle size is included on the surface cross-linked layer.

8. The super absorbent polymer of claim 7, wherein the glass hollow particle has a particle size of 10 to 100 µm and a density of 0.1 to 0.7 g/cc.

9. The super absorbent polymer of claim 7, wherein the centrifuge retention capacity (CRC) for a physiological saline solution (0.9 wt % sodium chloride aqueous solution) for 30 minutes is 35 to 45 g/g and the absorbency under pressure (AUP) at 0.7 psi for a physiological saline solution (0.9 wt % sodium chloride aqueous solution) for 1 hour is 15 to 0.8 g/g.

10. The super absorbent polymer of claim 7, wherein the super absorbent polymer has an extractable content of 25% by weight or less.

* * * * *